(12) United States Patent
Berge et al.

(10) Patent No.: US 6,298,519 B1
(45) Date of Patent: Oct. 9, 2001

(54) MODULAR APPARATUS FOR WASHING AND WIPING A VEHICLE WINDSHIELD

(75) Inventors: Gilles Berge, Rambouillet; Jean-Pierre Eustache, Antony; Jean-Louis Roumegoux, Paris, all of (FR)

(73) Assignee: Valeo Systemes d'Essuyage (FR)

( * ) Notice: Subject to any disclaimer, the term of this patent is extended or adjusted under 35 U.S.C. 154(b) by 769 days.

(21) Appl. No.: 08/506,387

(22) Filed: Jul. 24, 1995

(30) Foreign Application Priority Data

Jul. 26, 1994 (FR) .................................................. 94 09335

(51) Int. Cl.[7] ................................. B60S 1/50; B62D 25/08
(52) U.S. Cl. .......................................... 15/250.03; 296/197
(58) Field of Search ........................... 15/250.01, 250.02, 15/250.03, 250.3; 296/192, 197

(56) References Cited

U.S. PATENT DOCUMENTS

| 4,179,153 | 12/1979 | Cole, Jr. . | |
|---|---|---|---|
| 4,677,943 | * 7/1987 | Skinner | 123/41.27 |
| 4,893,865 | * 1/1990 | McClain et al. | 296/192 |
| 5,082,078 | 1/1992 | Umeda et al. . | |
| 5,327,613 | * 7/1994 | Ohtsu | 15/250.01 |

FOREIGN PATENT DOCUMENTS

| 3704325 | 8/1988 | (DE) . | |
|---|---|---|---|
| 4040731 | 6/1991 | (DE) . | |
| 0588708 | 9/1993 | (EP) . | |
| 704526 | 2/1932 | (FR) . | |
| 2 684 950 | 6/1993 | (FR) . | |
| 2 668 110 | 4/1994 | (FR) . | |
| 62-173356 | * 7/1987 | (JP) | 15/250.01 |

OTHER PUBLICATIONS

La Fonction grille d'auvent [The Function of a Cowl Grid]; 1141 Ingenieurs de L–Automobile (1993) Juin/Juillett, No. 682, Garches FR.

French Search Report, Apr. 21, 1995.

* cited by examiner

*Primary Examiner*—Terrence R. Till
(74) *Attorney, Agent, or Firm*—Morgan & Finnegan, LLP

(57) ABSTRACT

A vehicle has a windshield and a hood extending away from the lower edge of the windshield. A modular windshield washing and wiping apparatus, disposed adjacent to the lower edge of the windshield, comprises at least two modules, arranged to be assembled together and to the remainder of the vehicle. One of the modules contains a screen washing liquid so as to act as a reservoir for the latter, while another module carries the screen wiping equipment. The apparatus includes at least one further liquid reservoir, comprised in one of the modules.

1 Claim, 4 Drawing Sheets

MODULAR APPARATUS FOR WASHING AND WIPING A VEHICLE WINDSHIELD

FIELD OF THE INVENTION

The present invention relates to apparatus for washing and wiping a vehicle windshield, in particular for a motor vehicle which has a hood extending away from the lower edge of the windshield.

BACKGROUND OF THE INVENTION

In such a vehicle, the space which lies between the hood and the lower edge of the windshield is conventionally used for accommodating the windshield wiper system. The same space is also used for admission of fresh air to the interior of the vehicle, which has an air inlet grille overlying this space. The vehicle also has screen washing means for washing the windshield, comprising a screen washing liquid reservoir together with means for spraying this liquid on to the windshield.

Conventionally, the screen washing liquid reservoir is arranged underneath the hood, in the front compartment of the vehicle. During manufacture, the operations of fitting on the vehicle the screen wiping means, the air admission means, the air inlet grille, and the reservoir and spraying components of the screen washing apparatus, are functions which require a considerable amount of time to accomplish. These assembly and fitting operations are not easy to carry out using automatic assembly machinery, and as a result they are particularly expensive.

It has been proposed to provide monobloc, or unitary, screen wiping and washing apparatus, in which the air admission means, the screen washing liquid reservoir, the screen wiping means and the means for directing the washing liquid on to the windshield, are all integrated, with a view to simplifying the operations of fitting these various components in the vehicle, and to make it possible to carry out these operations using automatic means.

It has also been proposed to provide a modular apparatus for wiping and washing the windshield of a vehicle, which avoids the use of monobloc wiping and washing apparatus that has to be specially adapted to a given model of vehicle. To this end, such a known apparatus includes at least one common module which can be used on various types or models of vehicle, thus tending to reduce manufacturing costs and providing the advantage of an economy of scale. More particularly, the modular apparatus comprises at least two modules, which can be assembled together and to the remainder of the vehicle, with one of the two modules being adapted to contain a screen washing liquid, so as to constitute a reservoir for the latter, while the other module acts as a support for the windshield wiping system itself.

An object of the present invention is to propose an improvement to such a design for a modular apparatus, such as to improve the modular character of the apparatus and to extend the advantages that result from the facility for assembling and fitting such an apparatus.

DISCUSSION OF THE INVENTION

According to the invention, a modular apparatus for washing and wiping a vehicle windshield comprises a hood extending away from the lower edge of the windshield, the apparatus being of the type comprising at least two modules arranged for assembly together and to the remainder of the vehicle, with one of the modules being adapted to contain a screen washing liquid so as to constitute a reservoir for the latter, while the other module supports means for wiping the windshield, is characterised in that one module comprises at least one further liquid reservoir.

This further reservoir may fulfil any one or more of the following functions:

it may contain a further screen washing liquid;

it may contain coolant liquid for the engine of the vehicle;

it may constitute an expansion chamber for the engine coolant liquid or for any other pressurised fluid circuit of the vehicle;

it may contain liquid for supply to a hydraulic control circuit of the vehicle, for example a hydraulic braking system;

it may act as a pressurised fluid Accumulator.

Further features and advantages of the invention will appear more clearly from a reading of the detailed description which follows, of preferred embodiments of the invention given by way of example only and with reference to the accompanying drawings.

DESCRIPTION OF PREFERRED EMBODIMENTS OF THE INVENTION

Figure 1:
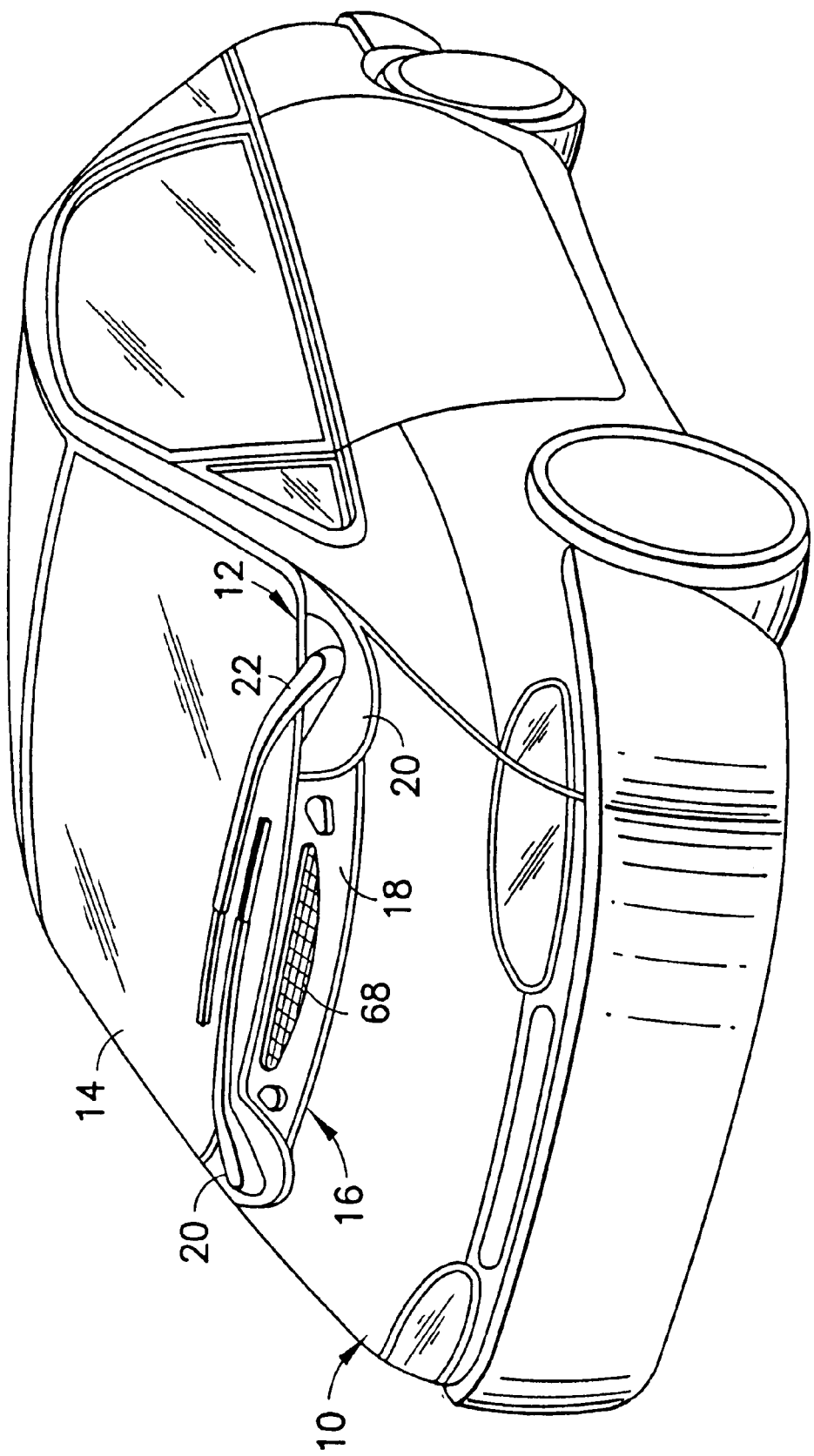
FIG. 1 is a diagrammatic perspective view showing a vehicle having a modular apparatus in accordance with the current state of the art.

FIG. 1 shows, diagrammatically and in perspective, a motor vehicle having a hood 10 lying below the level of, and extending forward from, the lower edge 12 of the windshield 14 of the vehicle. The hood 10 is equipped with a modular apparatus 16 for washing and wiping the windshield 14 in accordance with the current state of the art.

In the example shown in FIG. 1, the modular apparatus 16 consists of a module which defines a reservoir 18, together with two screen wiping modules 20.

The reservoir module 18 has an exposed upper face which is generally flat and which forms an extension of the outer surface of the hood 10. This upper face extends longitudinally over part of the width of the vehicle, on either side of a longitudinal plane of symmetry of the bodywork of the vehicle. The reservoir module 18 extends laterally between the hood 10 and the lower edge 12 of the windshield 14.

The screen wiping modules 20 also have an exposed upper face, which again forms an extension of the outer surface of the hood 10. The modules 20 are arranged on either side of the reservoir module 18, of which they form an extension towards the sides of the vehicle. The modules 20 overlie the space that exists between the hood 10 and the lower edge 12 of the windshield 14. Each screen wiping module 20 carriers a screen wiper arm 22, of a kind known per se and having at one of its ends means for fastening the arm 22 on a drive spindle (not shown), which is coupled to means for driving the spindle in rotation. The other end of each wiper arm carries a conventional wiper blade which includes a wiping strip for wiping over the windshield 14.

Figure 2:
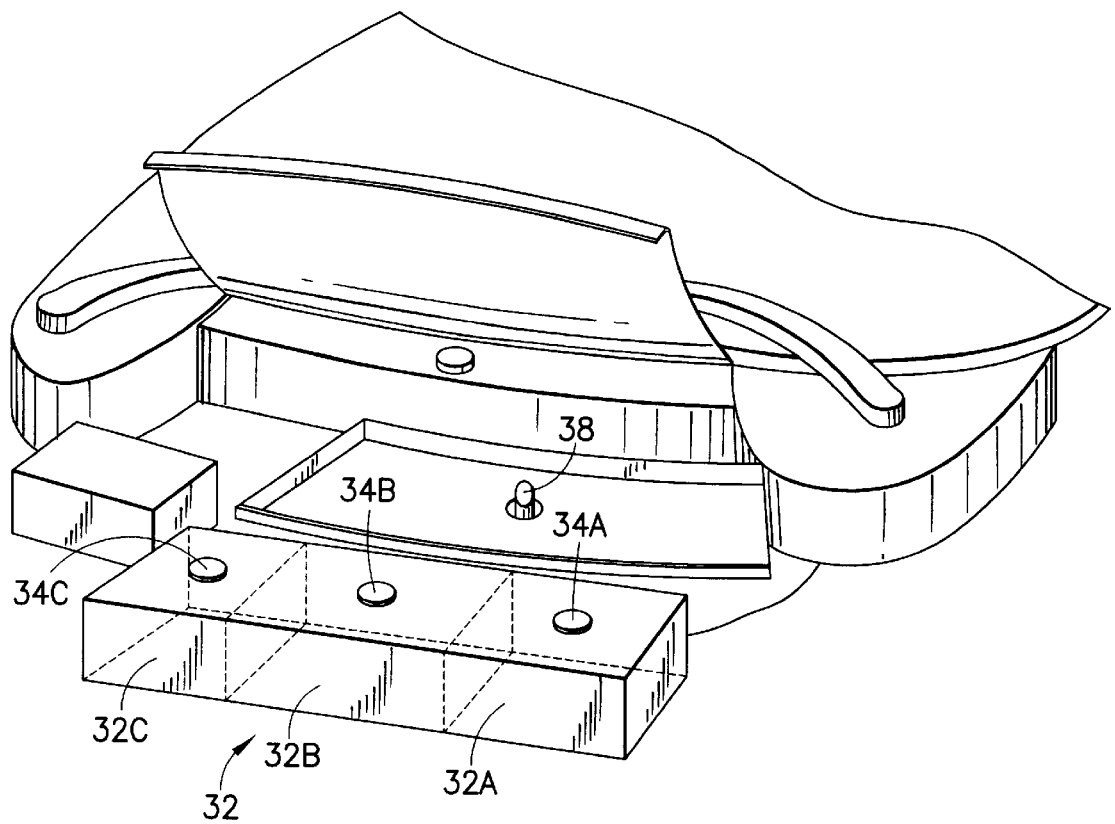
FIG. 2 is a detailed perspective view on a larger scale, showing one embodiment of the modular apparatus in accordance with the invention.
Figure 3:
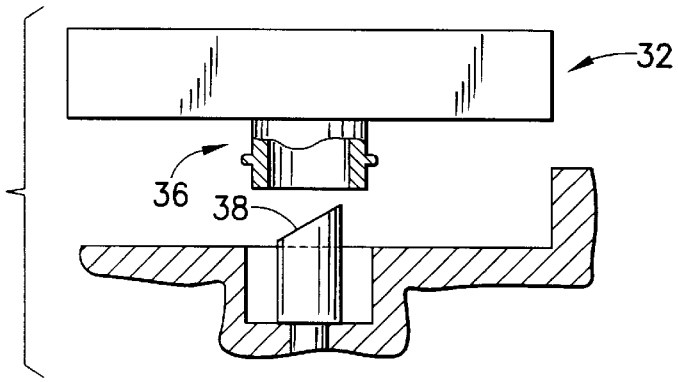
FIGS. 3 and 4 are views on a larger scale than FIG. 2, showing in partial transverse cross section means for connecting the various compartments or chambers of the supplementary reservoirs.

Reference is now made to all of FIGS. 1 to 4. The reservoir module 18 in FIG. 1 is one of the compartments which constitute a compartment reservoir or larger module 32, defining three adjacent chambers 32A, 32B and 32C of the reservoir. Each of these chambers has a filler cap 34A, 34B and 34C respectively. Each of the compartments or chambers 32A, 32B and 32C is autonomous, and may contain, for example, either a screen washing liquid different from that in another one of the chambers, or a rinsing liquid. The larger module 32 may he made so that it is removable, as is indicated diagrammatically in FIG. 2. Each of the compartments may include in its lower part sealed connecting means 36, such as those indicated diagrammatically in FIGS. 3 and 4. These connecting means provide automatic connection by piercing the base of each compartment with a chamfered end 38 of a connecting duct which is disposed in the base of the modular apparatus. FIG. 2 shows only one of these piercing ends 38.

Figure 4:
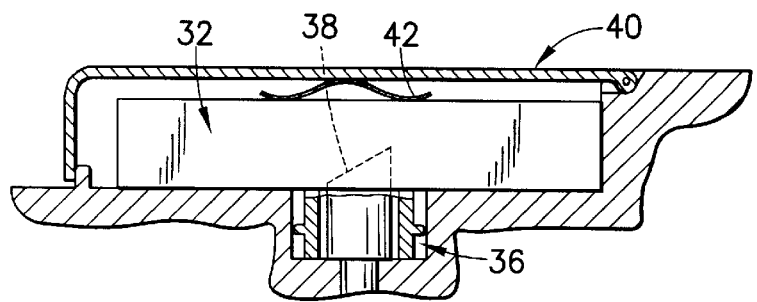

FIG. 4 shows one embodiment of a means for retaining the reservoir 32 in position. It should be noted that it performs this function irrespective of whether the reservoir 32 is divided into compartments, or whether it consists of several small reservoirs juxtaposed together. In FIG. 4, this retaining means consists of an articulated closure flap 40, which completes the upper face of the modular apparatus, and which exerts a downward pressure, through leaf springs 42, on the supplementary reservoir or reservoirs 32, so as to retain the latter in position.

Figure 5:
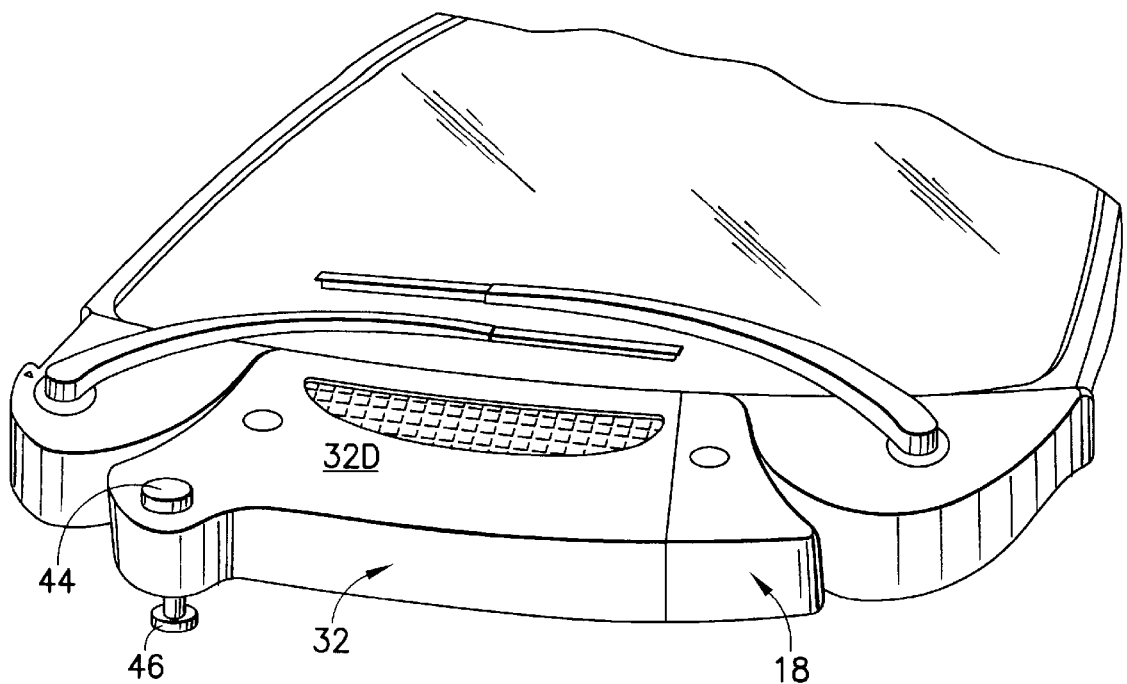
FIG. 5 is a view similar to FIG. 2, but showing a first modified embodiment of the modular apparatus.

In the modified embodiment shown in FIG. 5, the large reservoir 32 is again divided into compartments, in this case two compartments. One of these is the screen washer liquid reservoir that constitutes the reservoir module 18, while the other compartment is a larger compartment 32D. The compartment 32D is a reservoir for the engine coolant liquid of the vehicle. This compartment 32D, or engine coolant reservoir, has at the top a filler cap 44 which is masked by the hood 10 FIG. 1 when the latter is closed. The compartment 32D also includes a suitable connector 46 arranged in its lower face, for connecting the reservoir 32 to the engine cooling circuit.

Figure 6:
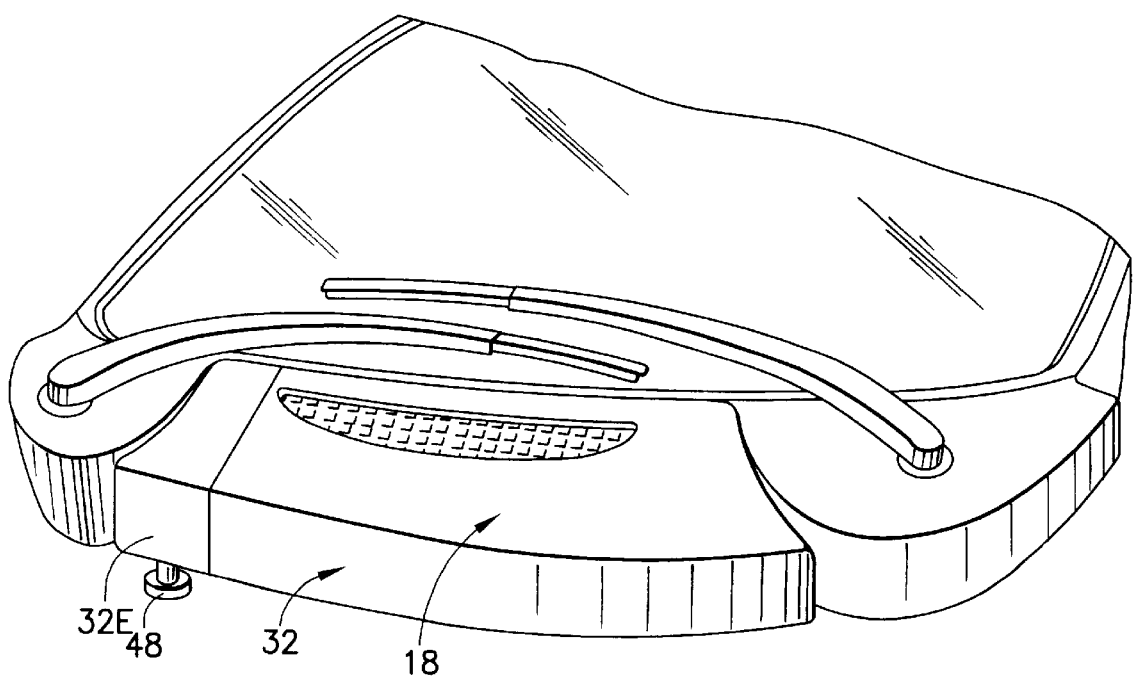
FIG. 6 is another view similar to FIG. 2, showing a second modified embodiment.

In the embodiment shown in FIG. 6, the large reservoir 32 includes, besides the reservoir module 18, a compartment 32E which is an expansion chamber for the engine cooling circuit. The compartment 32E again has a suitable connector 48, for connection in this case to the cooling circuit.

Figure 7:
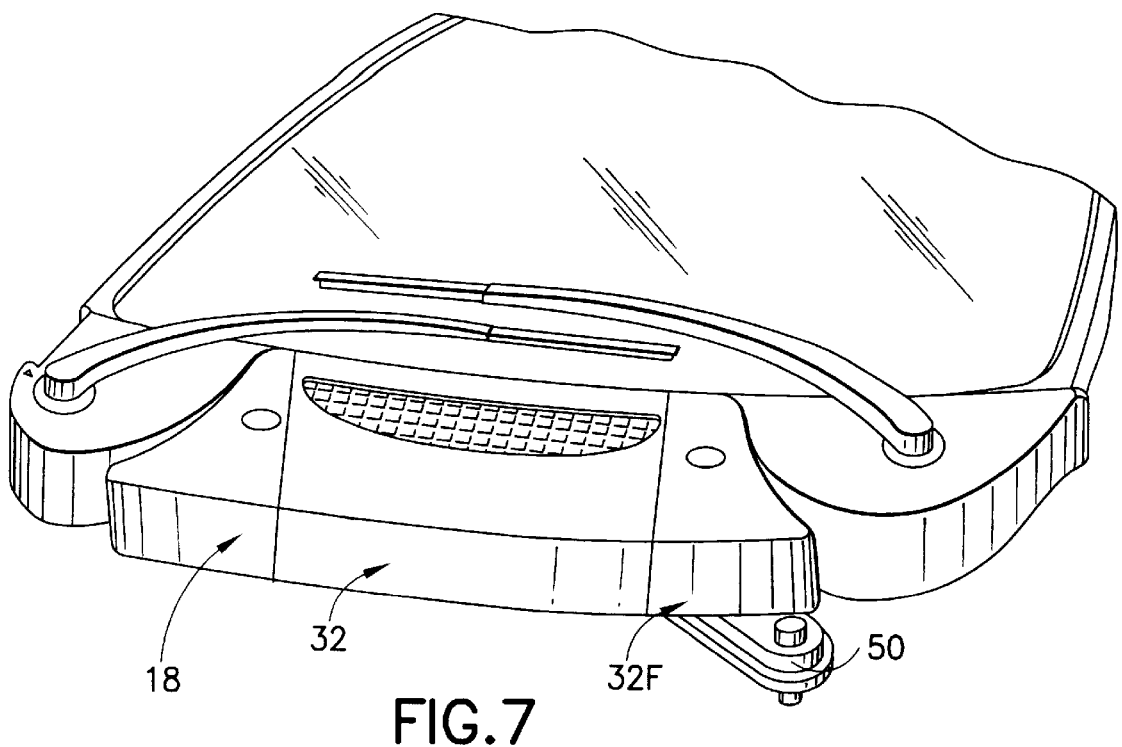
FIG. 7 is a further view similar to FIG. 2, but showing a third modified embodiment.

In the further embodiment shown in FIG. 7, the large reservoir 32 includes at least one compartment 32F, which is a brake fluid reservoir from which the hydraulic braking system of the vehicle is supplied.

Figure 8:
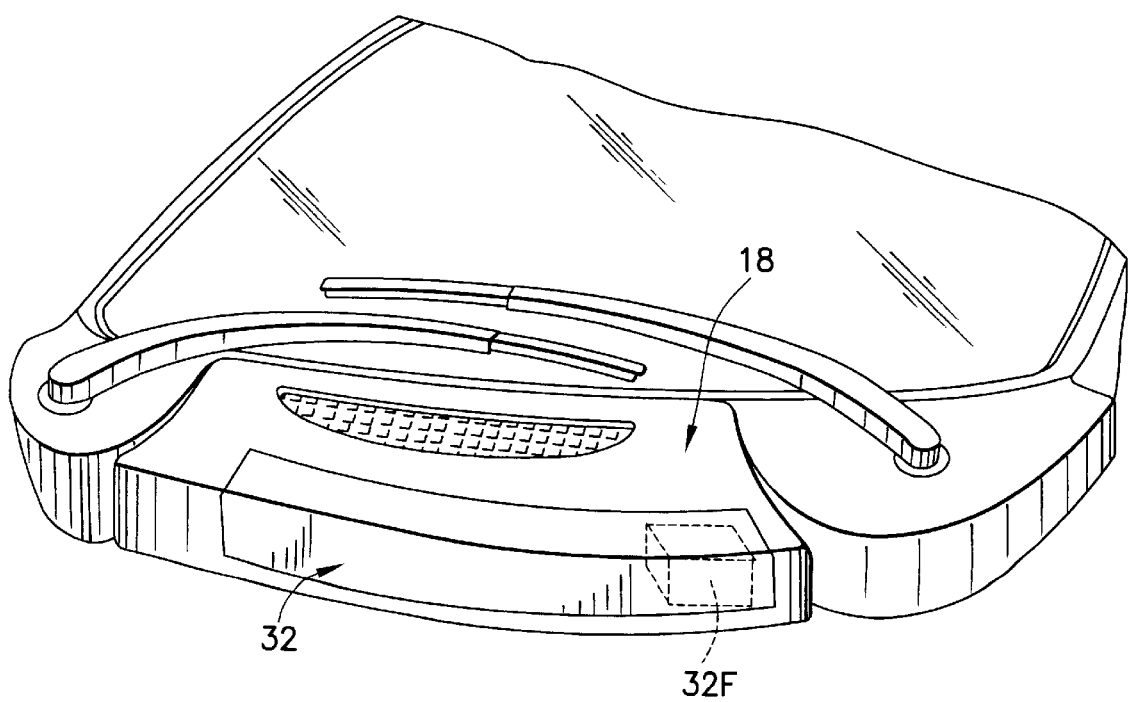
FIG. 8 is yet another view similar to FIG. 2, and shows a fourth modified embodiment.

Finally, in the embodiment shown in FIG. 8, the large reservoir, or complementary reservoir, 32 is made in the form of a removable element which may, for example, contain a small compartment 32F for containing the brake fluid, or for acting as an accumulator for pressurised fluid.

What is claimed is:

1. A modular windshield washing and wiping apparatus, for a windshield of a vehicle which includes the windshield, the windshield defining a lower edge thereof, and a hood extending away from the lower edge, the modular apparatus including wiping means for the windshield and comprising a plurality of modules adapted for assembly together and to the vehicle, one of said modules constituting a windshield washing liquid reservoir and another said module carrying the wiping means, one of said modules including at least one further liquid reservoir, wherein said further reservoir is a pressurized fluid accumulator.

* * * * *